United States Patent [19]

Kraft

[11] 4,036,533
[45] July 19, 1977

[54] FORCE LIMITING DEVICE FOR A PARKING BRAKE ACTUATOR ARRANGED IN SERIES WITH A SERVICE BRAKE ACTUATOR

[75] Inventor: Uno Ingemar Kraft, Malmö, Sweden

[73] Assignee: Svenska Aktiebolaget Bromsregulator, Malmo, Sweden

[21] Appl. No.: 746,116

[22] Filed: Nov. 30, 1976

[30] Foreign Application Priority Data

Dec. 5, 1975 Sweden .............................. 7513714

[51] Int. Cl.² ...................... B60T 15/02; F16D 65/14
[52] U.S. Cl. ............................... 303/6 A; 188/106 P; 303/68
[58] Field of Search ............. 303/6 R, 6 A, 6 C, 6 M, 303/9, 13, 14, 50, 52, 68, 69, 71, 84 A; 188/106 P, 106 R, 106 F, 151 A, 170, 345, 153; 137/102

[56] References Cited

U.S. PATENT DOCUMENTS

| | | | |
|---|---|---|---|
| 2,726,738 | 12/1955 | Fawick | 303/13 |
| 3,443,839 | 5/1969 | Hinrichs et al. | 303/13 X |
| 3,456,988 | 7/1969 | Gibbons et al. | 303/71 X |

Primary Examiner—George E. A. Halvosa
Assistant Examiner—Douglas C. Butler
Attorney, Agent, or Firm—Laurence R. Brown

[57] ABSTRACT

A force limiting device for a parking brake actuator is arranged in series with a service brake actuator to limit the maximum force of the two actuators to the maximum force from one of them. One actuator works from hydraulic pressure and the other from air pressure. Thus, an overflow valve controls the hydraulic pressure and is forced closed by an adjustable spring and open by either hydraulic pressure in a valve chamber or by air pressure exerted on a valve plunger. Both sides of the valve are maintained at the hydraulic pressure while the valve outlet is both closed or open.

7 Claims, 1 Drawing Figure

U.S. Patent   July 19, 1977   4,036,533
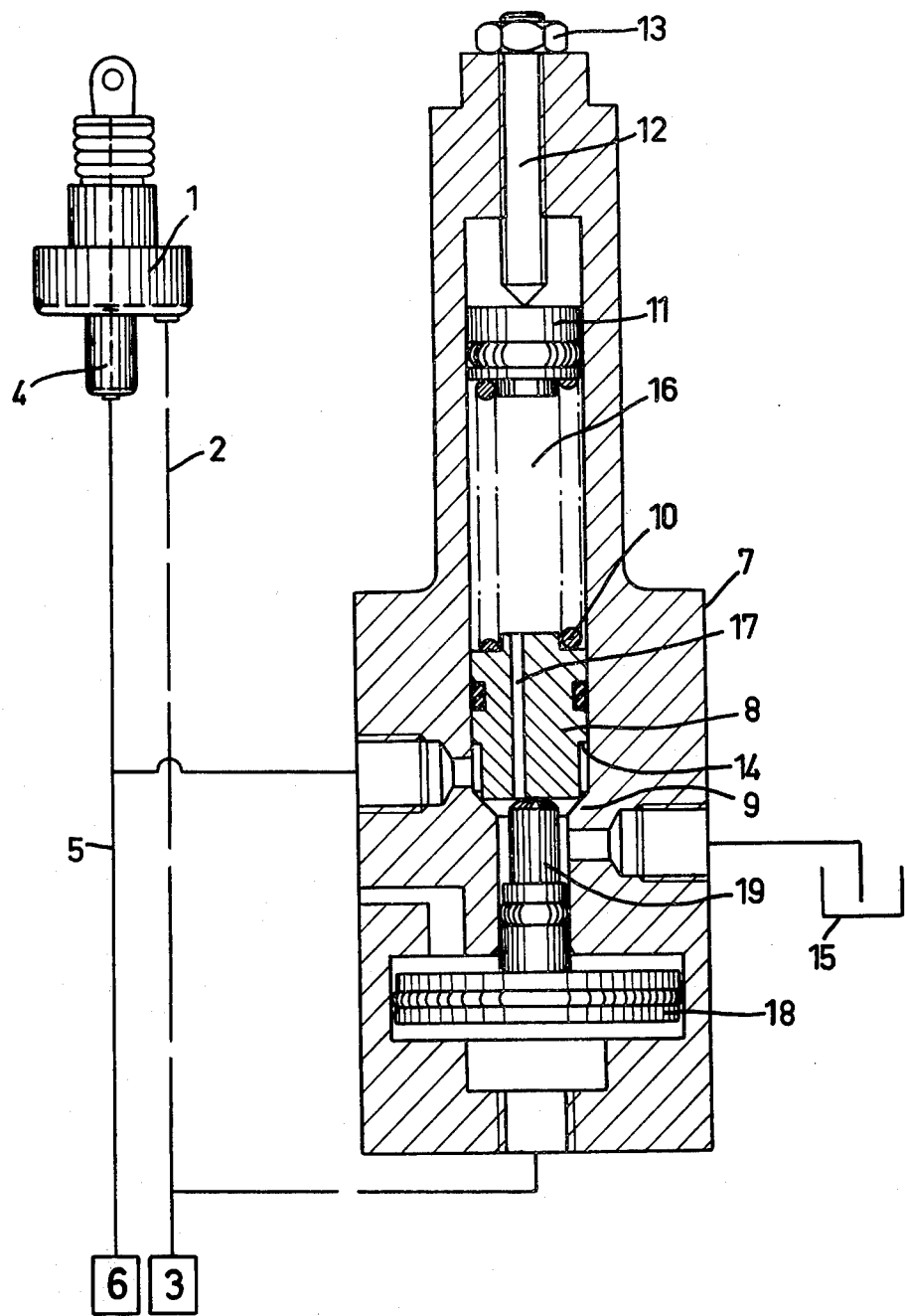

FORCE LIMITING DEVICE FOR A PARKING BRAKE ACTUATOR ARRANGED IN SERIES WITH A SERVICE BRAKE ACTUATOR

This invention relates to a force limiting device for a parking brake actuator arranged in series with a service brake actuator, preferably a hydraulic pressure controlled parking brake actuator arranged in series with an air pressure controlled service brake actuator.

Each of these actuators must be able to give a satisfactory brake force, which means that if added the forces may cause damages on different parts in the brake system. A force addition should therefore be avoided and the maximum force from the actuators for example be limited to the maximum force from one of them.

It is possible to achieve this result in many ways. An important requirement is, however, that the force limiting device with the function to control the pressures in the supply systems for the actuators is such that the service brake pressure will always be available even if any failure in the force limiting device occurs. A further requirement is that the device shall be as simple and cheap as possible but still reliable.

All these different requirements are according to the invention fulfilled by an overflow valve controlling the hydraulic pressure and whose valve body is arranged to be forced in its valve closing direction by the force from a spring and in its valve opening direction by the force from on one hand the hydraulic pressure, on the other hand the air pressure.

In a preferred embodiment the force from the air pressure is brought to the valve body by a plunger acting with its push rod on the valve body at the outlet side of the overflow valve.

Further features of the device according to the invention are that the valve body is biassed against its seat by a metal compression spring adjustable from the outside, further that the valve body is provided with a shoulder at the inlet side of the valve, and that a compartment in the valve at the spring side of the valve body communicates with the outlet side of the valve, preferably by means of an axial channel through the valve body.

Preferably the dimensioning of the spring, the valve body shoulder and the plunger is such that the overflow valve opens and reduces the prevailing hydraulic pressure if at a combined supply of hydraulic and air pressure the combined actuator force exceeds the maximum force from the hydraulic pressure controlled parking brake actuator.

BRIEF DESCRIPTION OF THE DRAWING

The invention will be described in further detail below, reference being made to the accompanying drawing showing an arrangement including a device according to the invention in a partly sectional view.

DETAILED DESCRIPTION

A conventional service brake actuator 1, which is to be connected to a brake rigging (not shown) of a vehicle, preferably a rail vehicle, can be supplied with air under a certain pressure through an air pressure supply line 2 from a source thereof, for example a service brake valve 3.

A hydraulic pressure controlled parking brake actuator 4 is arranged on the service brake actuator 1 with its piston rod arranged to act on the piston of the latter. It can be supplied with hydraulic oil under a certain pressure through a hydraulic pressure supply line 5 from a source 6 thereof.

Both actuators must be dimensioned each separately to give a satisfactory brake force, which however means that a simultaneous application of them can lead to damages on the brake system and therefore should be avoided.

For that reason the two supply lines 2 and 5 are connected to a force limiting device 7, which may be described as a modified overflow valve.

A valve body 8 is biassed against a valve seat 9 by a metal compression spring 10. A spring support 11 for the spring 10 may be axially displaced from the outside by means of a screw 12 held in a set position by a lock nut 13.

At the inlet side of the valve from the hydraulic pressure line 5 the valve body 8 is provided with a shoulder 14, whose area will determine the force on the valve body 8 from the hydraulic pressure counteracting the force from the spring 10. If the force from the hydraulic pressure exceeds that from the spring 10 the valve body 8 will lift from its seat 9 and permit a flow to the outlet side of the valve, for example connected to a tank 15.

As appears from the drawing both the valve body 8 and the spring support 11 are sealed relative to the cylindrical bore in which they are movable. The compartment 16 thus formed communicates with the outlet side of the valve by means of an axial channel 17 through the valve body 8. In this way the same pressure will prevail at both sides of the valve body 8 irrespective of whether the outlet side of the valve is connected to a tank 15 with atmospheric pressure as shown or to further means at a pressure different from the atmospheric.

In the valve is also arranged a plunger 18 with a push rod 19, both sealed in a conventional way relative to their respective cylindrical bores. The plunger 18 is under the action of the air pressure prevailing in the line 2, whereas its opposite side is under atmospheric pressure as shown. It is evident that the force from the air pressure in the line 2 will act on the valve body 8 via the plunger 18 and it push rod 19 in the same direction as the force from the hydraulic pressure in the line 5.

The desired function of the valve is to prevent the combined force from the two actuators 1 and 4 from exceeding the maximum force from the parking brake actuator 4. For this reason the area of the valve body shoulder 14 is so dimensioned relative to the force of the spring 10 that the valve body 8 will be about to lift from its seat 9 at the maximum hydraulic pressure for the actuator 4. Now, assume that the service brake actuator 1 is applied by a certain air pressure in the line 2. This pressure will also act on the plunger 18 and thus on the valve body 8, resulting in the opening of the overflow valve if at an application of the parking brake actuator 4 the total force from the hydraulic and air pressure in the valve opening direction exceeds the force from the spring 10. By suitably choosing the area of the plunger 18 it will be possible to attain a condition in which the total force from the combined actuators 1 and 4 cannot exceed the maximum force from the parking brake actuator 4.

It is important to note that the service brake system is left unaffected by the device according to the invention, even if a malfunction of the valve should occur.

Further, it can be observed that the shown fluid line system is very simplified in order to promote the understanding of the essence of the invention.

Many modifications are possible within the scope of the appended claims. First it shall be noted that although the invention is said to cover a force limiting device for a hydraulic pressure controlled parking brake actuator arranged in series with an air pressure controlled service brake actuator it is equally applicable to any system with two fluid pressure controlled actuators arranged in series, although the described system is most common and preferred.

It is further within the scope of the claims to design the plunger 18 as a diaphragm and even to have a completely different practical way of actuating the valve body 8 with the force from the air pressure in the valve opening direction.

What is claimed is:

1. A force limiting device connected with the hydraulic and air pressure lines in a braking system having the hydraulic pressure line coupled to control a parking brake actuator and the air pressure line connected to control a service brake actuator wherein said brake actuators are connected in series, said force limiting device operable to limit the maximum force on the two actuators to that maximum force supplied by a single one of said pressure lines, and comprising in combination, an overflow valve connected between the hydraulic line and a hydraulic tank to control flow in a path from said line into said tank, a movable valve member for closing and opening said path, a bias spring holding said member in a position closing said path, hydraulic means operable from pressure in said hydraulic line to overcome the force of said spring and open said path at a predetermined hydraulic pressure, and air means operable from pressure in said air line to overcome the force of said spring and open said path at a predetermined air pressure in the line.

2. A valve as defined in claim 1 wherein said movable valve member comprises a movable rod, and said air means comprises an air pressure controlled plunger pushing said rod in the opening direction.

3. A valve as defined in claim 2 including a cavity in said valve comprising the outlet end of said flow path surrounding said plunger.

4. A valve as defined in claim 2 wherein the dimension of said plunger, the bias force of said spring and the valve closure dimensions are proportioned to reduce said hydraulic line pressure when a combined supply of hydraulic and air pressure exceed the maximum predetermined force for controlling said parking brake actuator from said hydraulic line.

5. A valve as defined in claim 1 wherein said spring is a metal compression spring, and means extending outside said valve provides an adjustable bias on said valve from said spring.

6. A valve as defined in claim 1 wherein said flow path has an inlet end comprising a cavity surrounding said movable valve member.

7. A valve as defined in claim 1 wherein said valve member moves axially and said flow path comprises an axial channel through the valve.

* * * * *